United States Patent
Xu et al.

(10) Patent No.: US 10,911,932 B2
(45) Date of Patent: *Feb. 2, 2021

(54) METHOD AND SYSTEM FOR HUB BREAKOUT ROAMING

(71) Applicant: iBasis, Inc., Lexington, MA (US)

(72) Inventors: Richard H. Xu, Wakefield, MA (US); Hwan Jang Tang, Concord, MA (US); Ajay Joseph, Lexington, MA (US)

(73) Assignee: iBasis, Inc., Lexington, MA (US)

( * ) Notice: Subject to any disclaimer, the term of this patent is extended or adjusted under 35 U.S.C. 154(b) by 412 days.

This patent is subject to a terminal disclaimer.

(21) Appl. No.: 15/670,745

(22) Filed: Aug. 7, 2017

(65) Prior Publication Data

US 2018/0063696 A1 Mar. 1, 2018

Related U.S. Application Data

(63) Continuation of application No. 13/827,996, filed on Mar. 14, 2013, now Pat. No. 9,788,188.

(Continued)

(51) Int. Cl.
*H04W 8/02* (2009.01)
*H04W 8/08* (2009.01)

(52) U.S. Cl.
CPC .............. *H04W 8/02* (2013.01); *H04W 8/082* (2013.01)

(58) Field of Classification Search
None
See application file for complete search history.

(56) References Cited

U.S. PATENT DOCUMENTS 7,912,477 B2  3/2011  Tamura et al.
8,059,599 B1 * 11/2011 Rogers .................. H04W 48/18
                                                  370/331

(Continued)

FOREIGN PATENT DOCUMENTS

JP    2010535456 A    11/2018
WO   WO 00/56085      9/2000

(Continued)

OTHER PUBLICATIONS

"Control and Optimize Your 4G LTE Network with Diameter Signaling Management", F5 Traffix Signaling Delivery Controller Datasheet: F5 Networks, Inc. 2014, pp. 1-11.

(Continued)

*Primary Examiner* — Ajit Patel
*Assistant Examiner* — Pamit Kaur
(74) *Attorney, Agent, or Firm* — Hamilton, Brook, Smith & Reynolds, P.C.

(57) ABSTRACT

According to at least one example embodiment, hub breakout roaming enables providing data access to a user network device, subscribed with a home network and roaming into a visited network, by a hub breakout system through the visited network. Upon receiving a request for data access from the visited network, the hub breakout system assigns an IP address to the user network device. The hub breakout system then routes data packets, associated with the data access requested by the user network device, to and from at least one corresponding data source, using the assigned IP address. The data source includes the Internet, a private network associated with home network, or any other service provider entity.

38 Claims, 9 Drawing Sheets

Related U.S. Application Data

(60) Provisional application No. 61/737,575, filed on Dec. 14, 2012.

(56) References Cited

U.S. PATENT DOCUMENTS

| | | | |
|---|---|---|---|
| 8,095,109 | B2 | 1/2012 | Rydnell Ct Al |
| 8,175,575 | B2 | 5/2012 | Cai et al. |
| 8,179,903 | B2 | 5/2012 | Gupta et al. |
| 8,270,942 | B2 | 9/2012 | Zabawskyj et al. |
| 8,295,830 | B1 | 10/2012 | Faccin |
| 9,154,993 | B1 | 10/2015 | Breau |
| 9,198,220 | B2 | 11/2015 | Sugimoto et al. |
| 9,392,436 | B2 | 7/2016 | Xu et al. |
| 9,479,951 | B2 | 10/2016 | Curtin et al. |
| 9,560,517 | B2 | 1/2017 | Keller et al. |
| 9,654,964 | B1 | 5/2017 | Carames |
| 9,756,522 | B2 | 9/2017 | Kotecha et al. |
| 9,788,188 | B2 * | 10/2017 | Xu .................. H04W 8/02 |
| 9,924,344 | B1 | 3/2018 | Datar |
| 10,470,031 | B2 | 11/2019 | Xu |
| 2002/0045424 | A1 | 4/2002 | Lee |
| 2002/0191576 | A1 * | 12/2002 | Inoue ................ H04L 12/4641 370/338 |
| 2007/0060097 | A1 | 3/2007 | Edge |
| 2007/0232301 | A1 | 10/2007 | Kueh |
| 2007/0263608 | A1 | 11/2007 | Han |
| 2008/0285492 | A1 | 11/2008 | Vesterinen |
| 2009/0047947 | A1 | 2/2009 | Giaretta et al. |
| 2009/0073995 | A1 | 3/2009 | Pandey et al. |
| 2009/0168694 | A1 | 7/2009 | Akselin et al. |
| 2009/0268668 | A1 | 10/2009 | Tinnakornsrisuphap et al. |
| 2010/0027533 | A1 | 2/2010 | Kant et al. |
| 2010/0097992 | A1 | 4/2010 | Velev et al. |
| 2010/0128677 | A1 | 5/2010 | Liu et al. |
| 2010/0272063 | A1 | 5/2010 | Kato et al. |
| 2010/0144344 | A1 | 6/2010 | Jiang |
| 2010/0150057 | A1 * | 6/2010 | Miklos ................ H04W 8/082 370/328 |
| 2010/0190470 | A1 | 7/2010 | Raleigh |
| 2010/0191612 | A1 | 7/2010 | Raleigh |
| 2010/0195621 | A1 | 8/2010 | Kekki et al. |
| 2010/0197268 | A1 | 8/2010 | Raleigh |
| 2010/0208658 | A1 | 8/2010 | Vesterinen |
| 2010/0232353 | A1 | 9/2010 | Hu et al. |
| 2010/0248713 | A1 | 9/2010 | Parker |
| 2011/0026453 | A1 | 2/2011 | Yan |
| 2011/0045828 | A1 * | 2/2011 | Madan ................ H04Q 3/0045 455/433 |
| 2011/0076985 | A1 | 3/2011 | Chami et al. |
| 2011/0103310 | A1 * | 5/2011 | Stojanovski ............ H04L 12/66 370/328 |
| 2011/0116499 | A1 | 5/2011 | Lim et al. |
| 2011/0130117 | A1 | 6/2011 | Fan et al. |
| 2011/0158171 | A1 | 6/2011 | Centonza et al. |
| 2011/0170517 | A1 | 7/2011 | Bakker et al. |
| 2011/0171953 | A1 | 7/2011 | Faccin et al. |
| 2011/0173332 | A1 | 7/2011 | Li |
| 2011/0176531 | A1 | 7/2011 | Rune et al. |
| 2011/0223887 | A1 | 9/2011 | Rune et al. |
| 2011/0225632 | A1 | 9/2011 | Ropolyi et al. |
| 2011/0235595 | A1 | 9/2011 | Mehta et al. |
| 2011/0235605 | A1 | 9/2011 | Yeoum et al. |
| 2011/0286384 | A1 | 11/2011 | Sugimoto et al. |
| 2011/0292896 | A1 | 12/2011 | Yeuom et al. |
| 2012/0003980 | A1 | 1/2012 | Lim et al. |
| 2012/0020284 | A1 | 1/2012 | Haddad |
| 2012/0039213 | A1 | 2/2012 | Cheng et al. |
| 2012/0039323 | A1 | 2/2012 | Hirano et al. |
| 2012/0044949 | A1 | 2/2012 | Velev et al. |
| 2012/0046058 | A1 | 2/2012 | Vesterinen et al. |
| 2012/0057463 | A1 | 3/2012 | Hurtta et al. |
| 2012/0082161 | A1 | 4/2012 | Leung et al. |
| 2012/0084184 | A1 | 4/2012 | Raleigh et al. |
| 2012/0093074 | A1 | 4/2012 | Sairanen et al. |
| 2012/0099573 | A1 | 4/2012 | Jalkanen |
| 2012/0101952 | A1 | 4/2012 | Raleigh et al. |
| 2012/0102174 | A1 | 4/2012 | Zhou et al. |
| 2012/0106508 | A1 | 5/2012 | Zhou et al. |
| 2012/0110193 | A1 | 5/2012 | Zhou et al. |
| 2012/0117251 | A1 | 5/2012 | Zhou et al. |
| 2012/0124220 | A1 | 5/2012 | Zhou et al. |
| 2012/0269162 | A1 | 10/2012 | Vesterinen et al. |
| 2012/0287844 | A1 | 11/2012 | Ophir et al. |
| 2013/0171974 | A1 | 7/2013 | Bae |
| 2013/0201933 | A1 | 8/2013 | Dennert |
| 2013/0279401 | A1 * | 10/2013 | Sander .................. H04W 48/18 370/328 |
| 2014/0036762 | A1 | 2/2014 | Al-Shalash |
| 2014/0086154 | A1 | 3/2014 | Sajadieh |
| 2014/0169286 | A1 | 6/2014 | Xu et al. |
| 2014/0269510 | A1 | 9/2014 | Xu |
| 2015/0050937 | A1 | 2/2015 | Rosar |
| 2015/0113044 | A1 | 4/2015 | Noldus |
| 2015/0131526 | A1 | 5/2015 | Noldus et al. |
| 2015/0215766 | A1 | 7/2015 | Russell |
| 2015/0382289 | A1 | 12/2015 | Rydnell |
| 2016/0192175 | A1 | 6/2016 | Van Veen |
| 2016/0262006 | A1 | 9/2016 | Keller |
| 2016/0330655 | A1 | 11/2016 | Vashi et al. |
| 2016/0373973 | A1 | 12/2016 | Rommer |
| 2017/0026334 | A1 | 1/2017 | Youn |
| 2017/0078942 | A1 | 3/2017 | Fan et al. |
| 2017/0142613 | A1 | 5/2017 | Singh et al. |
| 2017/0156043 | A1 | 6/2017 | Li |
| 2017/0188398 | A1 | 6/2017 | Youn |
| 2017/0222932 | A1 | 8/2017 | Negm |
| 2017/0339552 | A1 | 11/2017 | Xu |

FOREIGN PATENT DOCUMENTS

| | | | |
|---|---|---|---|
| WO | WO 2001/65872 A1 | 9/2001 | |
| WO | WO 2007/109955 A1 | 10/2007 | |
| WO | WO 2009/024182 A1 | 2/2009 | |
| WO | WO-2009024182 A1 * | 2/2009 | ............ H04W 80/04 |
| WO | 2009/018533 A | 5/2009 | |
| WO | WO 2009/101638 A2 | 8/2009 | |
| WO | WO 2011/072438 A1 | 6/2011 | |
| WO | WO 2011/080744 A1 | 7/2011 | |
| WO | WO 2012/050841 A1 | 4/2012 | |
| WO | WO 2012/064980 A1 | 5/2012 | |
| WO | WO 2014/093086 A1 | 6/2014 | |
| WO | WO 2017/001640 A1 | 1/2017 | |
| WO | WO 2018/003954 A1 | 1/2018 | |

OTHER PUBLICATIONS

"Stateful GTP Correlation", Gigamon, pp. 1-9, Dec. 2013.
"Feature Brief GTP Correlation", Gigamon, Nov. 2016, pp. 1-4.
"Convene Networks", ConveneGSC, Mar. 3, 2016, http://web.archive.org/web/20160331075107/http://www.convenenetworks.com/solutions/convenegsc/; 2 pages.
First Examination Report for New Zealand Application No. 709097, dated Jul. 31, 2017.
GSMA IR.65 IMS Roaming & Interworking Guidelines Version 8.0 (May 9, 2012), pp. 1-26.
Sanyal, R., "Challenges in Interoperability and Roaming between LTE—Legacy core for Mobility Management, Routing, Real Time Charging," *Telecom World (ITU WT), 2011 Technical Symposium at ITU*, pp. 116-122, IEEE Conference Publications (2011).
Copeland, R. and Crespi, N., "Resolving Ten MVNO Issues with EPS Architecture, VoLTE and Advanced Policy Server," *Intelligence in Next Generation Networks (ICIN), 2011 15th International Conference on Digital Object Identifier: 10.1109/ICIN.2011.6081093*, pp. 29-34, IEEE Conference Publications (2011).
Lim, H., et al., "Reducing Communication Overhead for Nested NEMO Networks: Roaming Authentication and Access Control Structure," *IEEE Transactions on Vehicular Technology*, 60(7): 3408-3423 (Sep. 2011).
Nishiyama, H., et al., "A Cooperative User-System Approach for Optimizing Performance in Content Distribution/Delivery Net-

(56) References Cited

OTHER PUBLICATIONS works," *IEEE Journal on Selected Areas in Communications*, 30(2): 476-483 (Feb. 2012).

Clark, M., et al., "Preparing for LTE Roaming," Syniverse Technologies [online], May 2011 [retrieved from the Internet URL: http://www.syniverse.com/files/LTE-Roaming-BARG-Workshop-bj.pdf] Located via Google.

Motorola, Inc., "Long Term Evolution (LTE): A Technical Overview," Technical White Paper [online], 2007 [retrieved from the Internet: www.motorola.com.], 15 pages.

Notification of Transmittal of the International Search Report and the Written Opinion of the International Searching Authority, or the Declaration in re: International Patent Application No. PCT/US2013/073046 entitled "Method and System for Hub Breakout Roaming"; dated Feb. 28, 2014.

Written Opinion of the Intellectual Property Office of Singapore dated Apr. 4, 2016 for SG Application No. 11201504451V entitled "Method and System for Hub Breakout Roaming".

\* cited by examiner

METHOD AND SYSTEM FOR HUB BREAKOUT ROAMING

RELATED APPLICATION

This application is a continuation of U.S. application Ser. No. 13/827,996, filed Mar. 14, 2013, now U.S. Pat. No. 9,788,188, which claims the benefit of U.S. Provisional Application No. 61/737,575, filed on Dec. 14, 2012. The entire teachings of the above applications are incorporated herein by reference.

BACKGROUND

Wireless communications systems such as the Long Term Evolution (LTE) mobile communications system, also referred to as Evolved Packet System (EPS) or $4^{th}$ Generation (4G) system, the Global System for Mobile (GSM) communications, or the Wideband Code Division Multiple Access (W-CDMA) mobile communications system, typically enable roaming services. Network operators of such wireless communications systems offer roaming services to their subscribers, therefore allowing the subscribers to stay connected even as they travel across different regions or countries. With an increasing consumption of data services, demand and consumption of roaming services are also increasing.

SUMMARY

Roaming services for mobile networks are usually employed according to home routed roaming or local breakout schemes. Home routed roaming suffers from long data delays and interoperability issues. Local breakout, while providing faster connection, may not be suitable for accessing private networks. According to at least one example embodiment, another roaming scheme, referred to herein as hub breakout roaming, enables data access to a mobile device, subscribed with a home network and roaming into a visited network, by a hub breakout system through the visited network. Upon receiving a request for data access from the visited network, the hub breakout system assigns an IP address to the mobile device. The hub breakout system then routes data packets, associated with the data access requested by the mobile device, to and from at least one corresponding data source, using the assigned IP address. The data source includes the Internet, a private network associated with the home network, or any other service provider entity.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Mobile technology experienced rapid evolution with deployment of packet-based infrastructures. Such revolution resulted in a significant increase in mobile subscribers compelled by a continually improving service quality and a variety of data services provided by mobile network operators (MNOs). In fact, wireless data traffic now exceeds voice traffic in wireless networks indicating a high consumption volume of data services. Mobile subscribers are more and more attached to their IP-based services as they, typically, spend long hours accessing data through their mobile devices. As such, mobile subscribers expect to be connected even as they travel across different towns, countries, or regions. Such expectation drives a strong demand for efficient and reliable roaming services.

Figure 1:
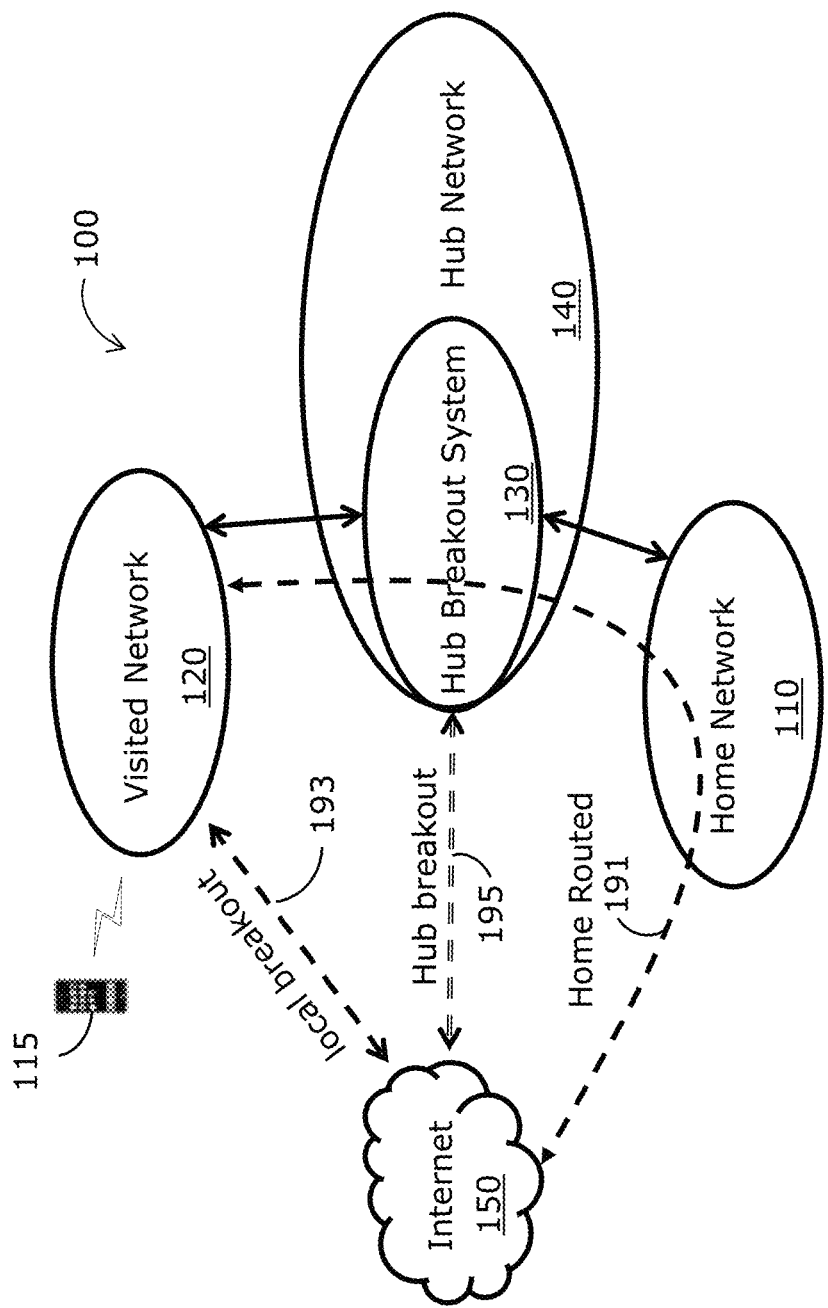
FIG. 1 is a block diagram illustrating an overview of a communications system with different approaches of handling roaming services between separate wireless communications networks.

FIG. 1 is a block diagram illustrating an overview of a communications system 100 with different approaches for handling roaming services between separate wireless communications networks. The communications system 100 includes a home wireless communications network 110, e.g., an LTE network, to which a user equipment (UE) 115, or a respective user, is subscribed. The UE 115 is roaming to a visited wireless communications network 120, e.g., a LTE network. According to at least one example embodiment, a hub breakout system 130, within a hub network 140, is coupled to both the home wireless communications network 110 and the visited wireless communications network 120. The hub breakout system 130 is configured to provide routing and interconnecting services. The hub breakout system 130 may further provide additional interoperability services. Examples of hub networks 140 include General Packet Radio Service (GPRS) Roaming eXchange (GRX) systems, Code Division Multiple Access (CDMA) Roaming eXchange (CRX) systems, Internet Protocol eXchange (IPX) systems, or the like. The IPX framework is a GSM Association endorsed service framework enabling IP reachability among core networks involved in a roaming service. The IPX system, in particular, is configured to provide interoperability of IP-based services and exchange of IP based traffic between different service providers according to service level agreements between the service providers.

Since more and more MNOs migrate to IP-based network architectures such as the Long Term evolution (LTE) system, IPX is gaining more attraction.

When the roaming UE 115 initiates a request for data access, e.g., a request for Internet access, data access may be provided to the UE 115 according to different approaches. A first approach is known in the art as home routing, or routed, roaming 191, in which an IP address is assigned to the UE 115, via the hub network 140, by the home network 110 and data traffic associated with the data access is routed from the home network 110 to the UE 115 through the visited network 120. A second approach is known in the art as local breakout roaming 193 in which the IP address is assigned to the UE 115 by the visited network 120 and data services are accessed by the UE 115 directly from the visited network 120. According to at least one example embodiment of the present invention, another roaming approach referred to herein as hub breakout 195 may be employed. In the hub breakout roaming 195, the IP address is assigned to the UE 115 by the hub breakout system 130. Data packets associated with data services requested by the UE are accessed by the hub breakout system 130 and routed to UE 115 through the visited network 120.

In the home routed roaming scenario 191, an IP address is assigned by a packet data network (PDN) gateway (P-GW) of the home network 110 to the UE 115 and a GPRS Tunneling Protocol (GTP) tunnel is established between a serving gateway (S-GW) of the visited network 120 and the P-GW of the home network 110. Data access is then provided to the UE 115 through the established GTP tunnel. With the IP endpoint being anchored at the home network 110, the roaming UE 115 accesses any IP based services, including home confined services or Internet accessible services, from the home network 110. As a result, the user experience of accessing certain services may suffer due to the long traversing delay over the GTP tunnel between the S-GW of the visited network and the P-GW of the home network.

Another challenge most MNOs usually face when employing the home routed roaming 191 is a protocol interoperability issue between the local S-GW of the visited network 120 and the remote P-GW of the home network 110. Each involved operator, e.g., acting as a visited network, has to establish the GTP tunnel connection between its own S-GW and all its partners' P-GWs. More than often, the GTP protocol variations among different vendor implementations cause tremendous efforts by operators to test and enable the protocol connections working with hundreds of remote P-GWs. The interoperability between variations of GTP protocols implemented by different vendors in the S-GWs or P-GWs of mobile networks represents a challenge when employing roaming services. Even with IP eXchange (IPX) framework, a visited network still has to test, at least once, and establish the GTP tunnel, or S8 interface, with each of its roaming partners' P-GW, one by one.

The testing of GTP tunnels is typically performed by the visited network 120 for each P-GW of a home network 110. The GTP tunnel testing involves testing of IP connectivity by analyzing parameters within protocol headers to check for any inconsistencies, if any. Such operational task tends to be consuming in terms of time and resources. An MNO may sometimes find it difficult to establish GTP tunnels with all its wished partners due to the limited resources and difficulty of resolving protocol incompatibility among multiple vendors' implementations. As such, the GTP tunnel testing may present a technical burden that may become sometimes a barrier for establishing a roaming relationship with another operator.

In the local breakout roaming scenario 193, the roaming UE 115 is assigned an IP address by a P-GW of the visited network 120 and a GTP tunnel is established between an S-GW of the visited network 120 and the P-GW of the visited network 120. The roaming UE 115 is able to access IP based services, for example, directly from the local visited network 120 without going through the long IP path, e.g., GTP tunnel established in a home routed roaming. Compared to the home routed roaming scenario 191, local breakout roaming 193 offers an improved user experience for accessing IP based services. However, under local breakout roaming 193, the roaming UE 115 may not be able to access home confined services, provided by the home network 110, because it employs an IP address acquired at the visited network 120. Home confined sub-networks within the home network 110 may not be accessible to IP addresses acquired at the visited network 120. Another issue associated with the architecture of local breakout roaming 193 is that charging data record (CDR), of a roaming user, generated at the P-GW of the visited network 110 is not immediately available to the home network 110. In a non-roaming situation or a home routed roaming scenario, the CDR generated by the P-GW of the home network may be used in real-time or pseudo real time, for example, to track each end user's data usage and to notify the end user when its usage reaches a certain predefined threshold.

According to at least one embodiment, IP based services include IP based voice services, e.g., voice over IP (VoIP) or voice over LTE (VoLTE), IP based video services, IP based messaging services, IP based data services, or the like. As such, the request for data access includes a request to access such services by the user of the UE 115. The hub breakout roaming may be employed when providing any of such services to the UE 115.

The hub breakout roaming 195 described herein offers solutions to the problems, described above, associated with the home routed roaming 191 and the local breakout roaming 193 scenarios. Hub breakout roaming simplifies the connection operation to each roaming partner, e.g., home network 110 and visited network 120, and overcomes the drawbacks associated with home routed roaming 191 and local breakout roaming 193. According to at least one example embodiment, in hub breakout roaming 195, one or more P-GWs associated with the hub breakout system 130, independent and separate of both the home network 110 and the visited network 120, are employed. The hub breakout system 130 and the hub network 140 are usually managed by an entity independent of the MNOs of the home and visited networks. When using the hub breakout roaming, an MNO acting as the visited network 120 connects its S-GW to one of the one or more P-GWs in the hub breakout system. During the first connection between the S-GW of the MNO and the P-GW of the hub breakout system 130, a GTP tunnel protocol between the S-GW of the MNO and the P-GW of the hub breakout system 130 may be tested. In case of successful testing, the GTP tunnel may then be used by the MNO for all its roaming UEs. Each roaming UE is assigned an IP address by the P-GW of the hub breakout system 130 to access the Internet, a confined service network, or walled-garden network, associated with the respective home network, or any other IP-based service. The CDR of the roaming user generated by the P-GW of the hub breakout system 130 is captured, classified and relayed back to the respective home network 110. The roaming user's identification information, such as International Mobile Subscriber Identity (ISMI) may be used to associate the generated CDR with the corresponding roaming user.

The hub network 140 may include multiple hub breakout systems 130 distributed across one or more geographic areas. A P-GW, of one of the multiple hub breakout systems 130, which is geographically close to the visited network 120 may be selected to establish the GTP tunnel with the S-GW of the visited network 120. As such, the hub breakout roaming 195 provides data access services with data access speed similar to that provided by local breakout 193. For example, a UE 115 with a respective home network 110 in the United States of America and roaming with a visited network 120 in China is provided data access using a P-GW, of one of the multiple hub breakout systems 130, located in China or Hong Kong. Similarly, if the same UE 115 is roaming with a visited network 120 in Germany, a P-GW, of one of the multiple hub breakout systems 130, located in Germany or elsewhere in Europe may be used.

Figure 2A:
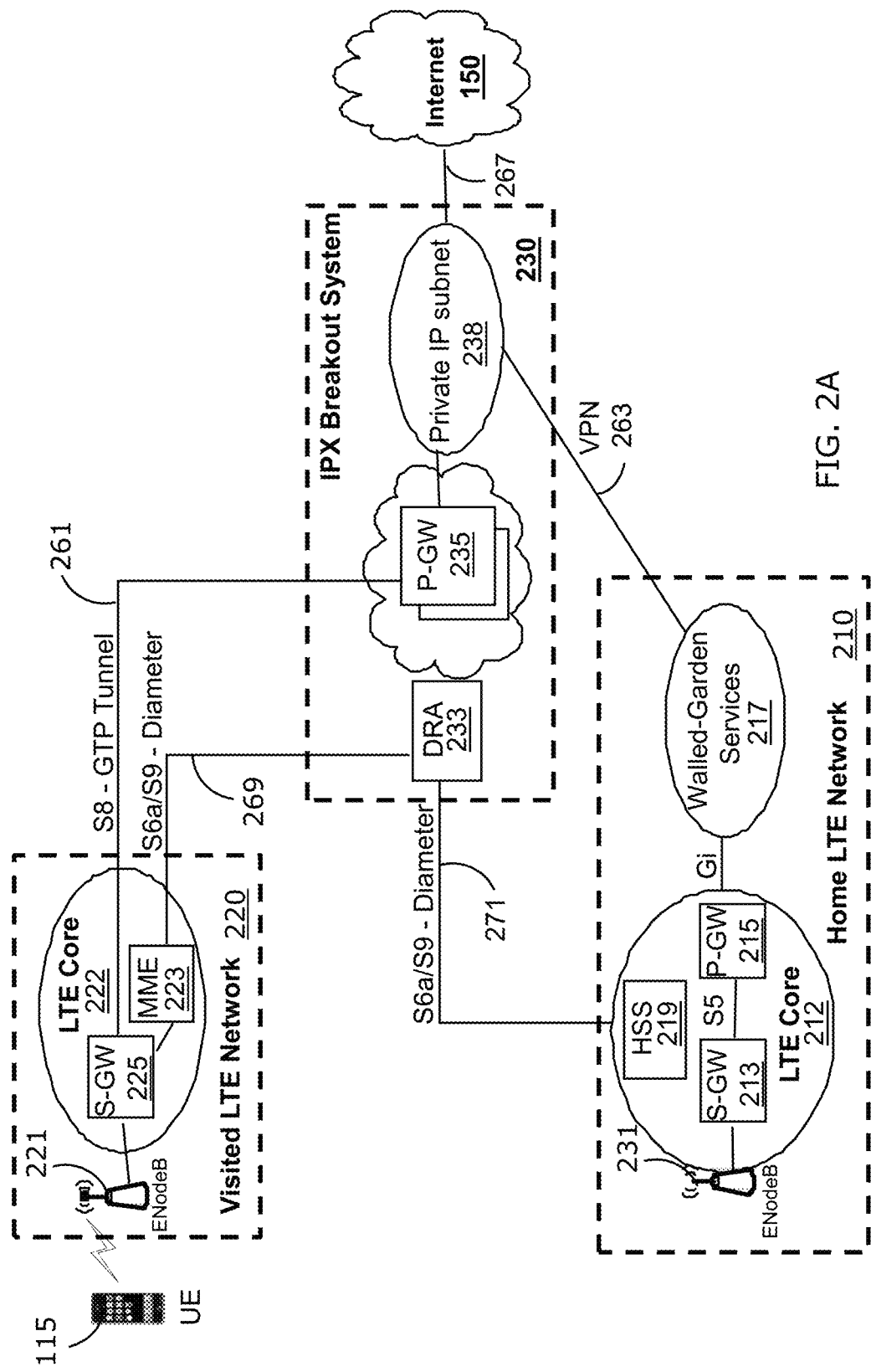
FIG. 2A is a block diagram of a communications system illustrating an Internet Protocol (IP) eXchange (IPX) breakout roaming approach, according to at least one example embodiment.

FIG. 2A is a block diagram of a communications system illustrating an IP eXchange (IPX) breakout roaming approach, according to at least one example embodiment. The UE 115, subscribed with an LTE home network 210 is roaming with a visited LTE network 220. The visited LTE network 220 includes an evolved node B (ENodeB) 221 configured to communicate with mobile devices, e.g., the UE 115, and coupled to a S-GW 225 within an LTE core 222. The S-GW 225 is coupled to a Mobility Management Entity (MME) 223 of the LTE core 222. The home LTE network 210 includes an ENodeB 231 connected to an LTE core system 212 which includes an S-GW 213 and a P-GW 215 coupled to each other. The LTE core 212 also includes a Home Subscriber Server (HSS) 219. The P-GW 215 is also coupled to a private network 217 of the home network 210 configured to provide walled-garden services such as domain name system (DNS) services, portal services, IP multimedia subsystem (IMS) services, banking services, or the like. An IPX breakout system 230 is acting as the hub breakout system 130 by providing roaming, interconnecting, and other interoperability services to the home LTE network 210 and the visited LTE network 220.

The IPX breakout system 230 includes one or more P-GWs 235. An IPX system acting as a hub network 140 may include multiple IPX breakout networks distributed across multiple geographic areas. The P-GWs 235 of the IPX system may be implemented as a service with different protocol variants or as a cluster of P-GWs 235 from different vendors. The IPX system and the P-GWs 235 therein may be managed and operated by one or more trusted service providers independent of the MNOs of the home and visited networks. The IPX breakout system 230 may also include a private IP subnet system 238 configured to provide and manage access of the private network 217. The private IP subnet system 238 includes, for example, a plurality of IP addresses known to the private network 217. The private IP subnet system 238 may further include one or more routers configured to route data packets, for example, to the Internet 150 or to the private network 217. The IPX breakout system 230 also includes a Diameter Routing Agent (DRA) 233 coupled to the MME 223 of the visited network 220 over S6a/S9 interface 269 and the HSS 219 of the home network 210 over S6a/S9 interface 271.

Upon a request for data access by the roaming UE 115, a GTP tunnel 261, also referred to as S8 interface, is established between the S-GW 225 of the visited LTE network 220 and the P-GW 235 of the IPX breakout system 230. The GTP tunnel 261 typically supports an IP connection between the S-GW 225 of the visited LTE network 220 and the P-GW 235 of the IPX breakout system 230. When employing IPX breakout roaming, the visited LTE network 220 uses the S8 interface 261 between its S-GW 225 and the P-GW 235 of the IPX breakout system 230 for all roaming UEs from different home LTE networks. As such, by testing, e.g., just once, and establishing the S8 interface 261, the visited LTE network 220 is then enabled to provide LTE roaming services to roaming devices associated with different home networks. By establishing a single GTP tunnel 261 with the IPX breakout system 230, instead of multiple GTP tunnels with different mobile networks, the MNO of visited LTE network 220 is spared the burden of addressing the interoperability issues associated with establishing multiple GTP tunnels with different other mobile networks as is the case when employing home routed roaming 191. The IPX breakout system 230 may select, or cause the selection of, a P-GW 235 that is geographically close to the visited network 220 for establishing the GTP tunnel 261. The IPX breakout system may select, or cause selection of, a particular P-GW based on other criteria such as the home network 210, the visited network 220, a user group associated with the roaming UE 115, the type of the UE 115, communication quality, delay associated with a corresponding communication path, capacity or bandwidth of a corresponding communication link, business consideration(s) such as agreements/arrangements with MNOs, or the like.

Depending on the type of data access or service requested by the roaming UE 115, the IPX breakout system 230 provides access of a respective data source such as the Internet 150 or the private network 217 of the home LTE network 210. For example, if the service requested by the roaming UE 115 relates to accessing the Internet 150, respective data packets are routed, by the IPX breakout system 230, between the P-GW 235 and the Internet 150, for example, through the communication link 267. Therefore, Internet access is provided to the roaming UE 115 over a communication path running from the visited LTE network 220 to the Internet 150 via the IPX breakout system 230. In another example where the service requested by the roaming UE 115 relates to a home confined service, e.g., a walled-garden service, associated with the private network 217, respective data packets are routed by the IPX breakout system 230 between the private IP subnet system 238 and the private network 217, for example, through a virtual private network (VPN) connection 263.

The roaming UE 115 is assigned an IP address, by the P-GW 235, that is recognized by the private network 217 in order to allow access to home confined services. Based on the assigned IP address, access to the Internet via the connection 267 or access to the private network 217 via the VPN connection 263 is provided to the roaming UE 115 by the IPX breakout system 230. Besides the assigned IP address, a routing policy is employed by the IPX breakout system 230 in order to enable access of, for example, the Internet 150 and the private network 217. The routing policy may be enforced by the private IP subnet system 238. For example, a private IP address known to the private network 217 may be assigned to the UE 115. In such case network address translation (NAT) is employed at the link 267 to allow Internet access, for example, by translating the private IP address into a public IP address. Alternatively, a public IP address may be assigned to the UE 115 by the P-GW 235 where the assigned public IP address belongs to a group of IP addresses pre-allocated by the private IP subnet system 238 to the home network 210. That is, the assigned public IP address is known to private network 217 and enables access of walled-garden services provided by the private network 217. Therefore, the IPX breakout roaming overcomes the shortcomings of local breakout roaming 193, because it enables roaming UEs 115 to access home confined services.

Each LTE MNO may operate as a home network and as a visited network. As such, each LTE MNO may provision two separate private links to the IPX breakout system 230, a first one for the S8 Interface IP connection 261 between its S-GW and P-GW 235 when acting as visited network, and the second for the VPN IP connection 263 between its private network and the respective designated private IP subnet system 238 when acting as home network. A person skilled in the relevant art should appreciate that the IPX breakout system 230 designates a private IP subnet system 238 for each MNO subscribed to, or may, act as a home network. The first link is to handle core network traffic, and the second one is to handle user traffic. The two links may correspond to two separate physical connections or share a single physical connection. If a single physical connection is shared, a VPN is used to separate the traffic.

Figure 2B:
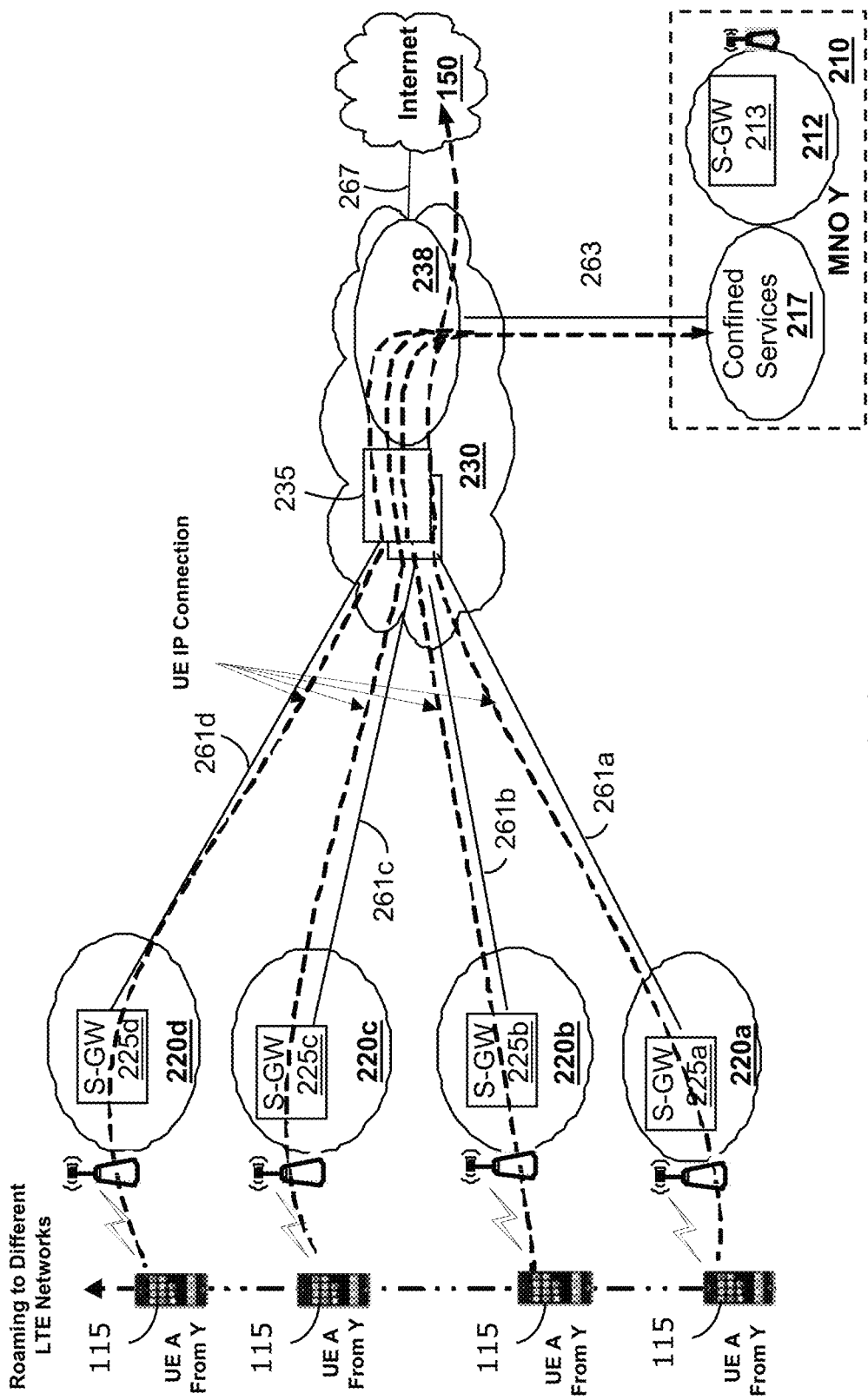
FIG. 2B is a block diagram of a communications system illustrating the handling of roaming services, according to IPX breakout roaming, associated with a mobile device roaming into multiple visited networks.

FIG. 2B is a block diagram of a communications system illustrating the handling of roaming services, through IPX breakout, associated with a mobile device roaming into multiple visited networks. The UE 115 associated with the home LTE network 210 roams with multiple visited networks, e.g., 220a, 220b, 220c, and 220d, as the corresponding user of the UE 115 travels across areas served by the visited LTE networks 220a, 220b, 220c, and 220d. At each visited LTE network, the local S-GW, e.g., 225a, 225b, 225c, and 225d, establishes an S8 interface, e.g., 261a, 261b, 261c, and 261d, to a P-GW 235 of the IPX system 230, and the end UE 115 is assigned an IP address, e.g., by the pre-defined private IP subnet 238 associated with the home network 210. For example, a private subnet 10.10.10.x is pre-allocated to the home network 210. Traffic associated with an IP address in such private subnet is routable to the private network 217 via a VPN connection 263 pre-defined between the home network 210 and the IPX Breakout System 230. The roaming UE 115 associated with the home LTE network 210 is able to access the Internet 150 via the interface 267, where routing and network address translation (NAT) is carried out for IP communication between private network and public Internet 150. Meanwhile, the roaming UE 115 is also enabled to access home confined services associated with the private network 217 via the pre-defined VPN or private connection 263.

Figure 3A:
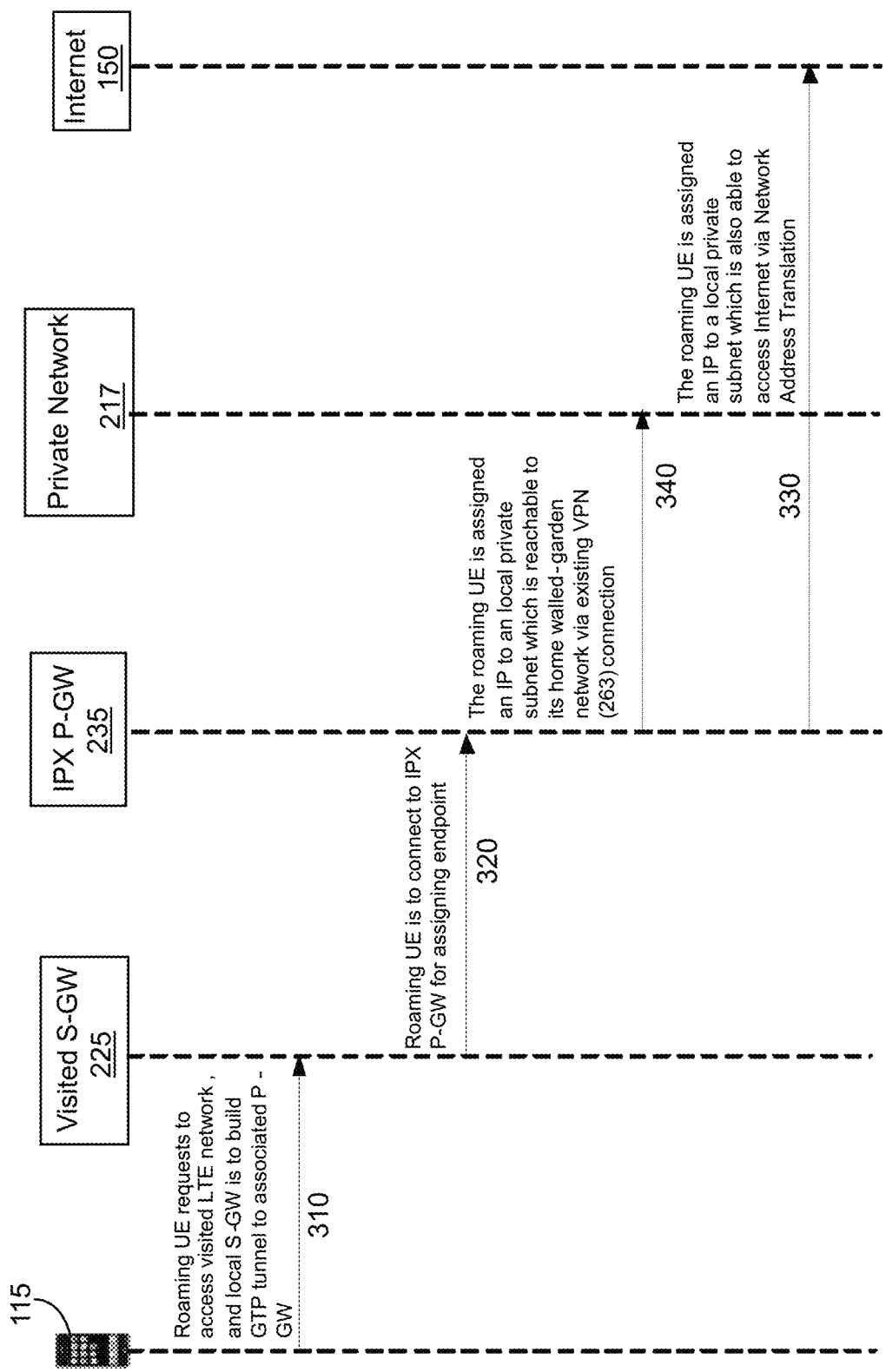
FIG. 3A is a signaling flow chart illustrating data signals exchanged between different entities when initiating a roaming session, according to a first example embodiment.

FIG. 3A is a signaling flow chart illustrating data signals exchanged between different entities when initiating a roaming session, according to a first example embodiment. The signaling shown in FIG. 3A illustrates the process of acquiring an IP address by the roaming UE 115, from the P-GW 235, and accessing home walled-garden services or the Internet 150 through a third party premise, e.g., IPX breakout system 230. At 310, a request for accessing a data service through the visited LTE network 220 is sent from the roaming UE 115. According to LTE standard procedures, the request of accessing a local visited LTE network 220 from the roaming UE 115 is managed by a local mobility management entity (MME) 223 together with the local S-GW 225. At 320, the S-GW 225 then builds a GTP tunnel, or S8 Interface, with the P-GW 235 based on pre-defined arrangement(s) or agreement(s). For example, given an agreement between the provider of the IPX breakout system and MNOs of both the visited and home LTE networks, the S8 interface 261 is built with a particular P-GW 235 of the IPX breakout system 230 based on, for example, an international mobile subscriber identity (IMSI) or an access point name (APN) associated with the UE 115. The MME 223 may, for example, instruct the S-GW 225 to connect to a particular P-GW 235 of the IPX system 230. The MME 223, for example, receives instructions from the IPX breakout system 230 indicative of the particular P-GW 235. The particular P-GW 235 may be selected/determined by the IPX breakout system 230 based on delay associated with respective data path(s), capacity or bandwidth associated with respective data link(s), UE type, the home network, the visited network, user group associated with the roaming UE 115, business reason(s), geographical location, or the like. The particular P-GW 235 assigns an IP address to the roaming UE 115 from the pre-defined private IP subnet 217 designated for the home LTE network 210. Using the assigned IP address, the UE 115 is able to access, at 340, home walled-garden services associated with the private network 217 via pre-connected VPN or private link 263, or access at 330 the Internet 150 via the connection 267. The VPN connection 263 is, typically, established before the data access service is provided to the UE 115. Usually, the VPN 263 is not dynamically built on the fly. The VPN may be a physical connection or an IP security (IPSec) connection over the Internet. According to an example embodiment, network address translation may be employed when accessing the Internet 150.

According to at least one example embodiment, the IPX breakout system 230 hosts and manages multiple private IP subnets corresponding to different mobile networks. A private IP subnet associated with a particular mobile network includes one or more IP addresses to be assigned to roaming UEs associated with the particular mobile network. The one or more IP addresses of the private IP subnet associated with the particular mobile network are typically recognizable by the particular mobile network and therefore enable a respective roaming UE to access private networks associated with the particular mobile network. The private IP subnets may further include routing policies and routers implementing such policies.

Figure 3B:
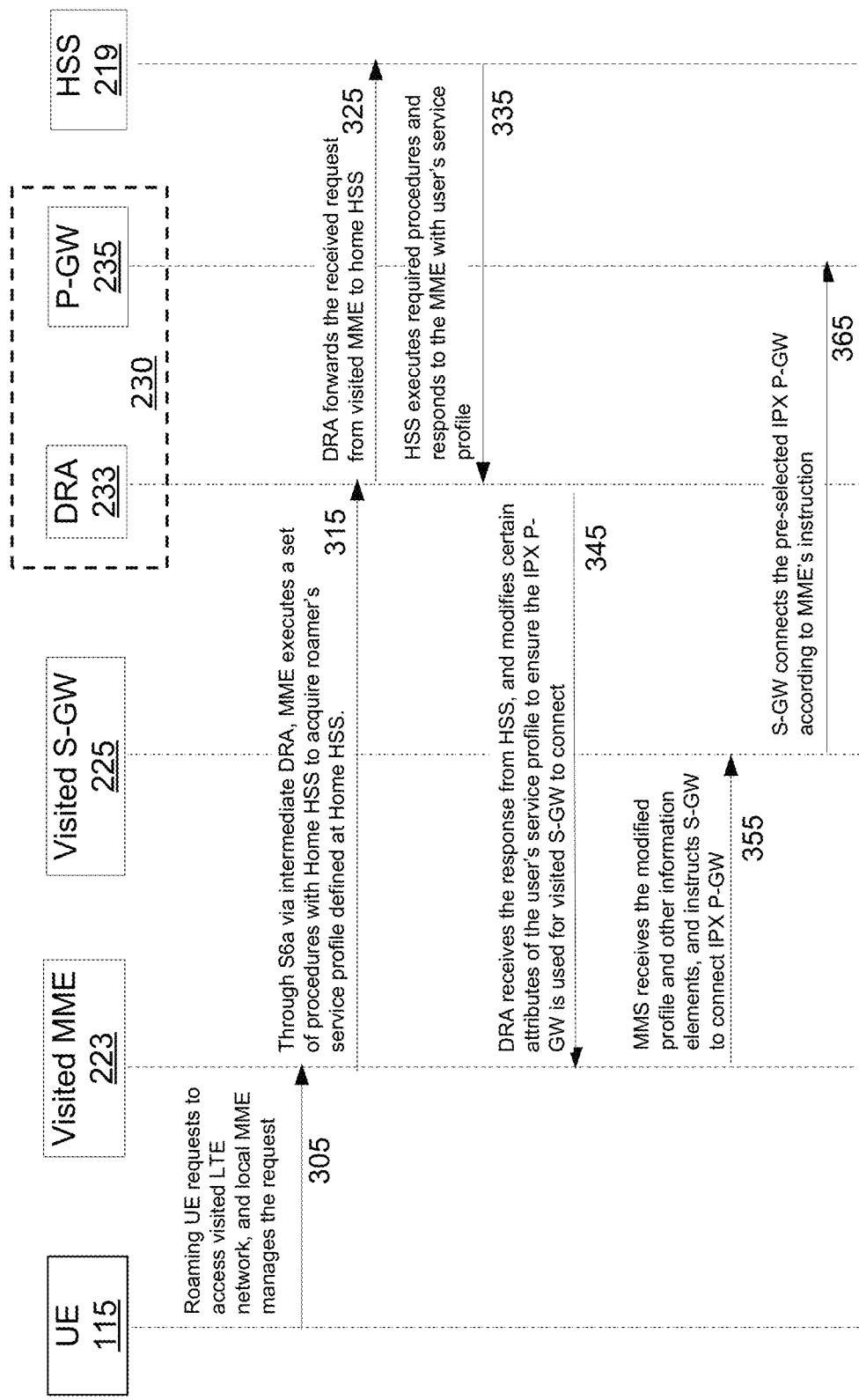
FIG. 3B is a signaling flow chart illustrating data signals exchanged between different entities when initiating a roaming session, according to a second example embodiment.

FIG. 3B is a signaling flow chart illustrating data signals exchanged between different entities when initiating a roaming session, according to a second example embodiment. Assuming, for example, there is no agreement between the MNO of the visited LTE network 220 and the operator of the IPX breakout system 230, FIG. 3B describes an approach of seamlessly selecting a P-GW, e.g., 235, of the IPX breakout system 230 by the visited LTE network 220 via Diameter signaling mediation at the Diameter Routing Agent (DRA) 233 of the IPX breakout system 230. According to LTE standard procedures, the local MME 223 authenticates and authorizes the roaming UE 115 to access the visited LTE network 220.

At 305, a request for service or data access is received by the MME 223 of the visited LTE network 220 from the roaming UE 115. Upon receiving the UE's request, the MME 223 communicates, at 315, with the Home Subscriber Server (HSS) 219 of the home LTE network 220 using Diameter-based signaling, e.g., S6a, via the DRA 233 of the IPX breakout system 230. At 325, the DRA 233 forwards the Diameter messages received from the MME 223 to the HSS 219. After going through standard procedures at both the MME 223 and the HSS 219, the service profile of the user of the UE 115 is sent back at 335 to the DRA 233 to be forwarded to the MME 223. The service profile includes multiple attributes such as "VPLMN Address Allowed" indicative of whether or not a local breakout is allowed, "PDN GW Identity" to identify the P-GW to which the S-GW 225 is to connect, or "PDN GW Allocation Type" to indicate whether the P-GW may be changed or not.

At 345, the DRA 233 receives the service profile, modifies or inserts one or more attributes in the service profile, and forwards the modified service profile to the MME 223. The modified service profile indicates that local breakout is not allowed, e.g., "VPLMN Address Allowed==No", identifies the P-GW 235 of the IPX breakout system 230 to be used, e.g., "PDN GW Identity==IP address of one of IPX P-GWs", and that the P-GW may not be changed, e.g., "PDN GW Allocation Type==Static". As such, the visited LTE network 220 may not use a local P-GW of the visited LTE network 220 to serve the roaming UE 115. Instead, the GTP tunnel 261 is established between the local S-GW 225 and the given static P-GW, whose IP address is provided in the modified service profile. In other words, the DRA 233 sends instructions to the MME 223, for example, with regard to a particular P-GW 235 to be used or to enforce IPX breakout roaming by modifying the user service profile. The particular P-GW 235 to be used is determined/selected by the DRA 233 based on delay associated with respective data path(s), capacity or bandwidth associated with respective data link(s), UE type, the home network, the visited network, user group associated with the roaming UE 115, business reason(s), geographical location, or the like. At 355, the local MME 223 instructs the local S-GW 225 to connect to the P-GW 235 identified in the service profile received by the MME 223. At 365, the local S-GW 225 connects to the P-GW 235 to establish the S8 interface 261 and get an IP address for the roaming UE 115. Once an IP address is assigned to the roaming UE 115, the roaming session may then start and the UE 115 may access the requested service.

A person skilled in the art should appreciate that to the visited LTE network 220, the roaming scenario according to FIG. 3B may be perceived as home routed roaming 191. In other words, the visited LTE network 220 may not realize that the P-GW 235 is in the IPX breakout system 230 and not in the home visited LTE network 210. A person skilled in the art should also appreciate that the signaling process described in FIG. 3B may be employed even when there is no agreement, or arrangement, between the operator of the visited LTE network 220 and the operator of the IPX breakout system 230.

Figure 4A:
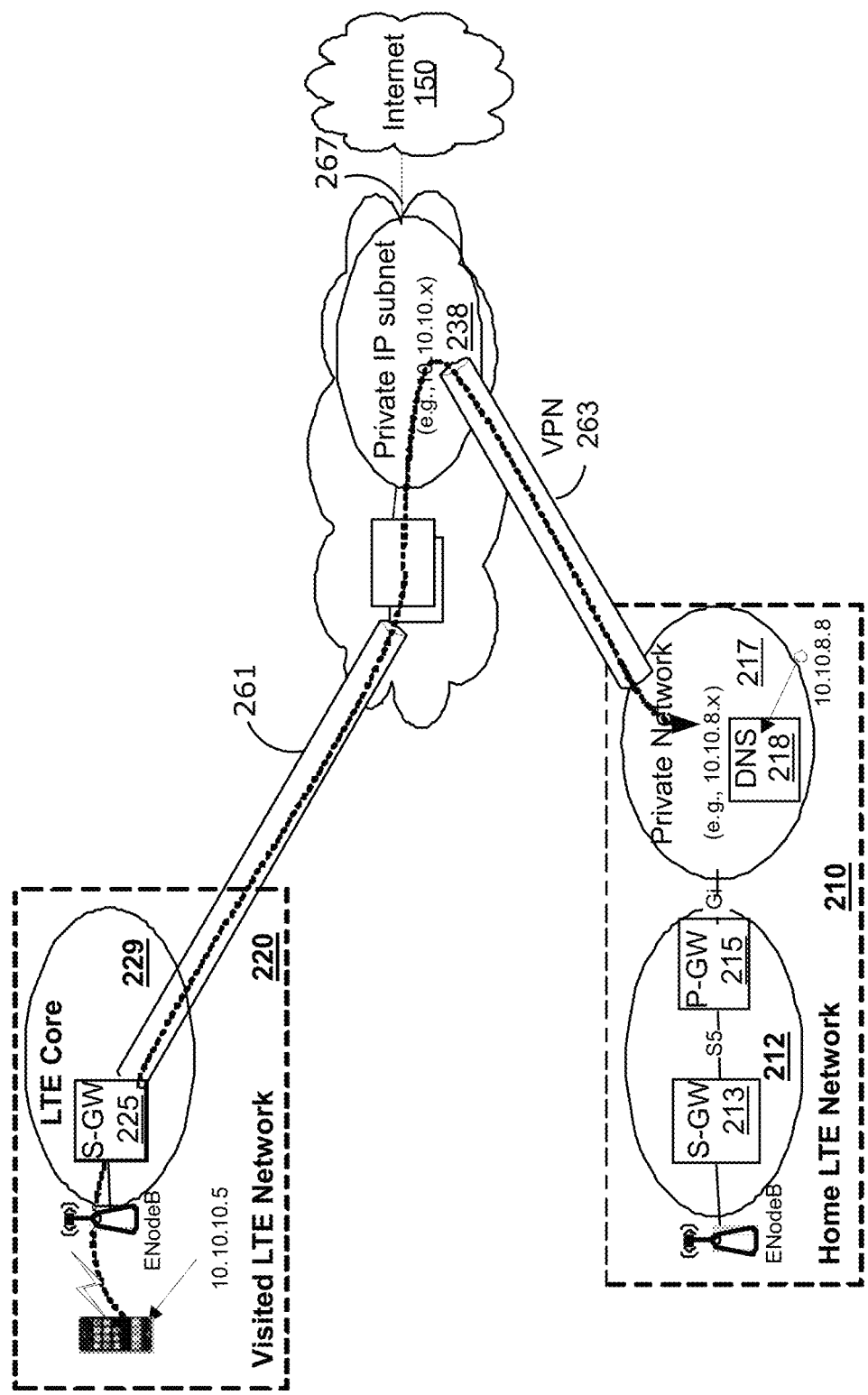
FIG. 4A is a block diagram of a communications system illustrating an example of accessing a home confined private network in IPX breakout roaming.

FIG. 4A is a block diagram of a communications system illustrating an example of accessing a home confined private network 217 in IPX breakout roaming. According to at least one aspect, a domain name system (DNS) server 218, associated with the private network 238, is assigned to the roaming UE 115. The DNS server 218 would typically be assigned to the UE 115, by the home P-GW 215, in the case of a non-roaming scenario or a home routed roaming 191 scenario. Any DNS query, by the UE 115, for resolving an IP address of targeted web address or a Fully Qualified Domain Name (FQDN) is then routed to home DNS server 218 via the private IP subnet 238 of the IPX breakout system 230 and the pre-connected VPN, or private link, 263. If the resolved IP address belongs to the private network 217, or respective walled-garden services, e.g., 10.10.8.10 as a private portal, the respective IP payload is routed to the private network 217 via the VPN connection 263. However, if the resolved IP address belongs to public Internet, the following IP payload is routed to Internet 150 via, for example, a network address translation (NAT) function over the interface 267 between the private subnet 238 and the public Internet 150. The roaming UE 115 is, therefore, able to seamlessly access both home walled-garden services associated with the private network 217 and the public Internet 150 under the IPX Breakout roaming architecture.

Figure 4B:
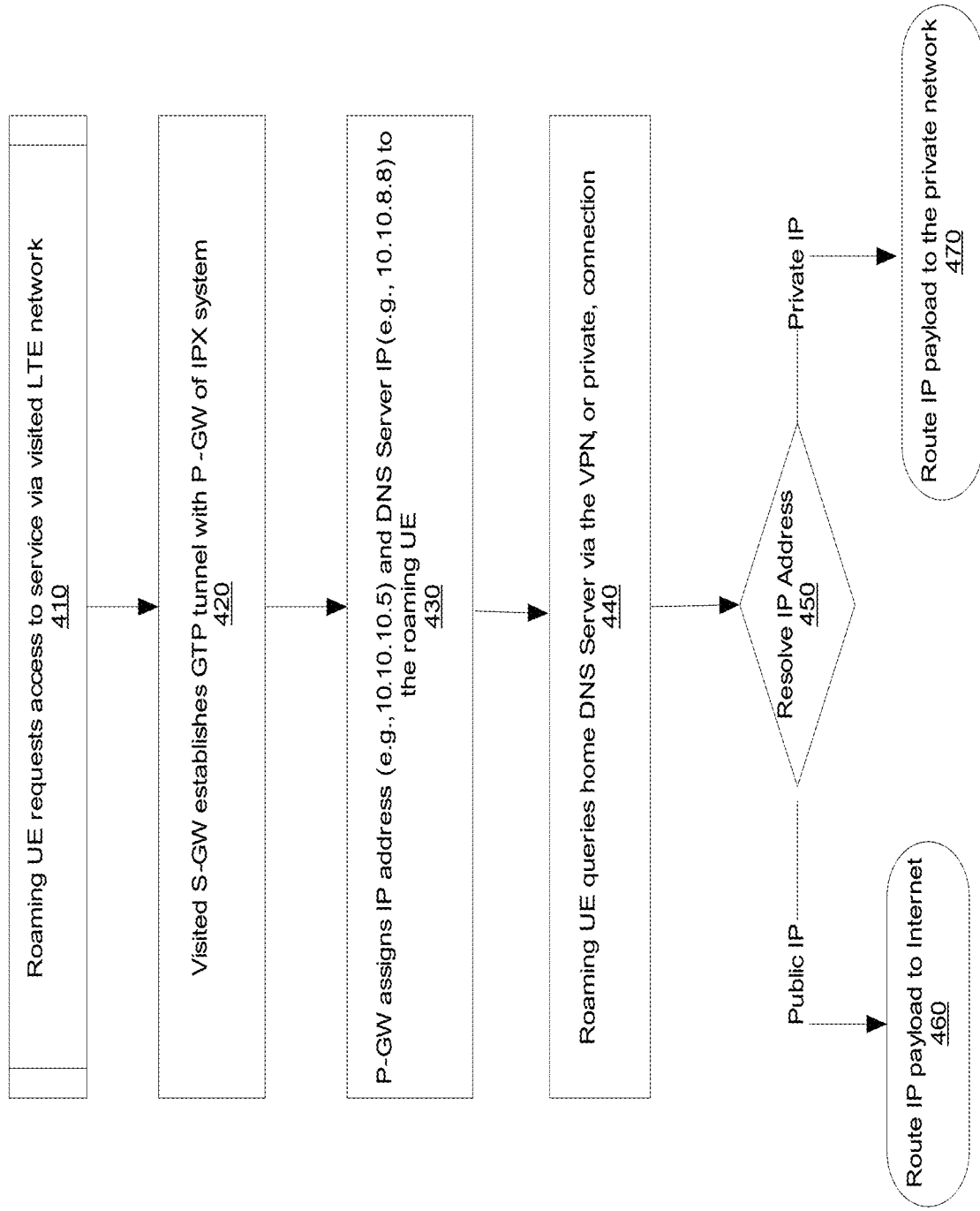
FIG. 4B is a flow chart illustrating a method of enabling access to a home confined private network in IPX breakout roaming.

FIG. 4B is a flow chart illustrating a method of enabling access to a home confined private network in IPX breakout roaming. At block 410, the roaming UE 115 requests service access through the visited LTE Network 220. At block 420, a GTP tunnel 261 is established between the S-GW of the 225 of the visited LTE network 220 the P-GW 235 of the IPX breakout system 230. At block 430, the roaming UE 115 is assigned an IP address by the P-GW 235 via the GTP Tunnel, or S8 interface, 261. The IP address of the home DNS server 218 is also assigned to the roaming UE 115. For example, the P-GW 235 assigns to the roaming UE the DNS Server IP address, e.g., 10.10.8.8, and an IP address, e.g., 10.10.10.5, selected from a pre-defined subnet, e.g., 10.10.10.x, maintained at the IPX system and associated with the Home LTE network 210. IP addresses of the subnet, e.g., 10.10.10.x, maintained at the IPX breakout system 230 are recognizable by the private network 207 (e.g., 10.10.8.x). At block 440, the roaming UE 115 queries the home DNS server 218 about an IP address, e.g., a website IP address. At 450, the DNS server 218 resolves the IP address and responds back to the UE 115. If the resolved IP address is public, the corresponding payload is routed, at block 460, to the Internet 150. If the IP address assigned to the roaming UE 115 is private, e.g., a home walled-garden service address, the corresponding payload is routed, at block 470, to the private network 217. The routing of IP payload is carried out by the IPX breakout system 230 either via the VPN connection 263 to the private network 217 or using a NAT function over the connection 267 when routing to the Internet 150.

Figure 5:
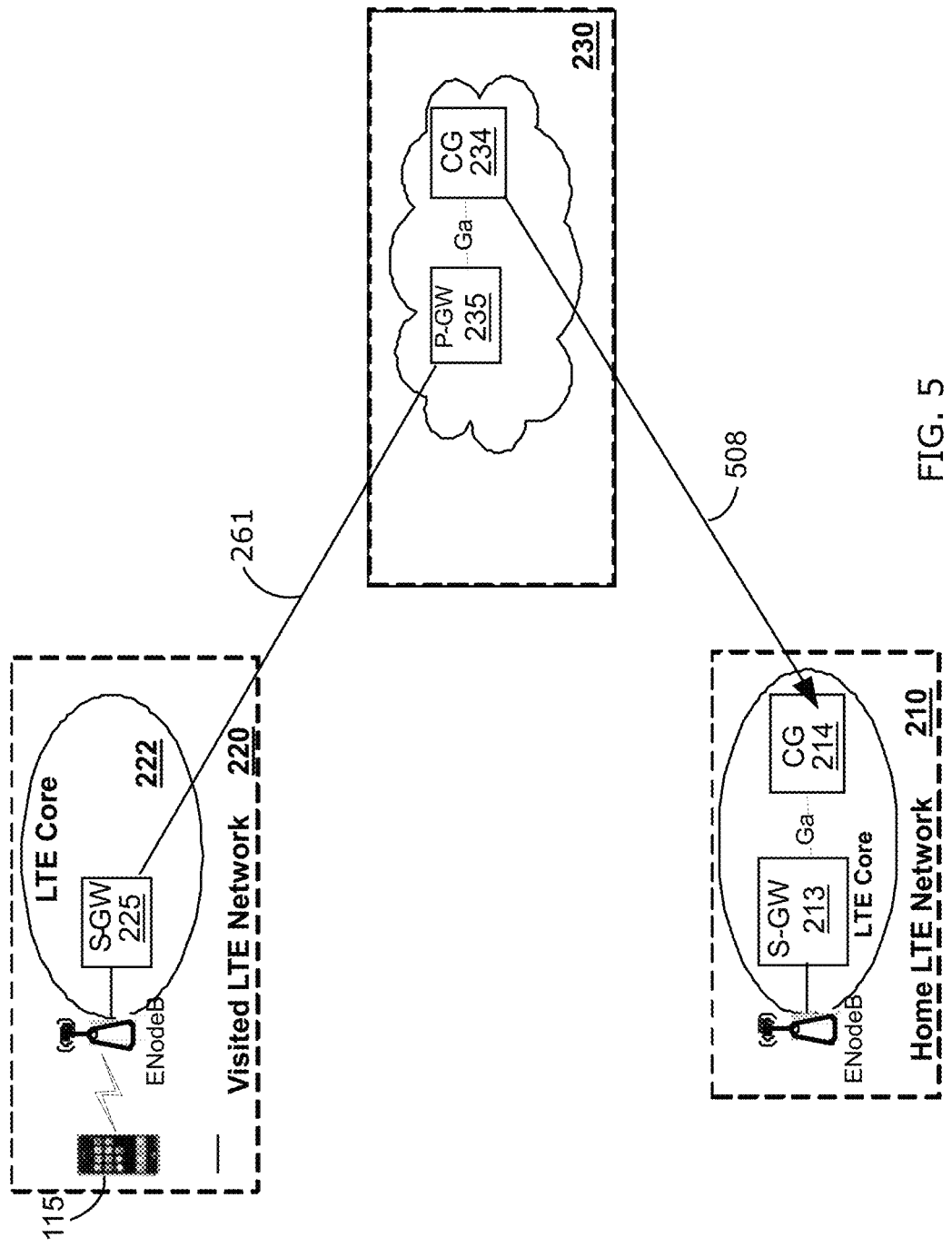
FIG. 5 is a block diagram of a communication system illustrating handling of charging data record (CDR) in IPX breakout roaming.

FIG. 5 is a block diagram of a communication system illustrating handling of charging data record (CDR) in IPX breakout roaming. The IPX breakout system 230 includes a charging gateway 234, which receives CDR(s) for the roaming UE 115 from the P-GW 235, where each roaming UE 115 is assigned an IP address for accessing services confined at home private networks or services over Internet. The collected CDR(s) associated with the roaming UE 115 are then sent to the CG 214 at home LTE network 210 in a real-time, or pseudo real time over communication interface 508. As such the home LTE network 210 may notify the user of the UE 115 about data usage while roaming. The MNO of the home LTE network may use the CDRs received from the IPX breakout system 230 as if they were collected via home P-GWs 215. In other words, all its existing applications based on the real-time collection of CDRs, used in non-roaming scenarios for example, may function correctly without any interruption in IPX breakout roaming scenarios. With the IPX Breakout and the CG at the IPX system premises, the home LTE MNO receives the CDRs related to its roaming UEs in a real-time fashion over the pre-provisioned IP connection between the IPX breakout system 230 and the home LTE network 210. The logical connections 269 or 263 may be used to carry the communication interface for exchanging CDRs data. The communication interface 508, for reporting CDRs between CG 234 and CG 214, may employ standard protocols known in the art such as GTP, or any other TCP/IP protocol, e.g., HTTP or SOAP, or any proprietary developed protocol.

Figure 6:
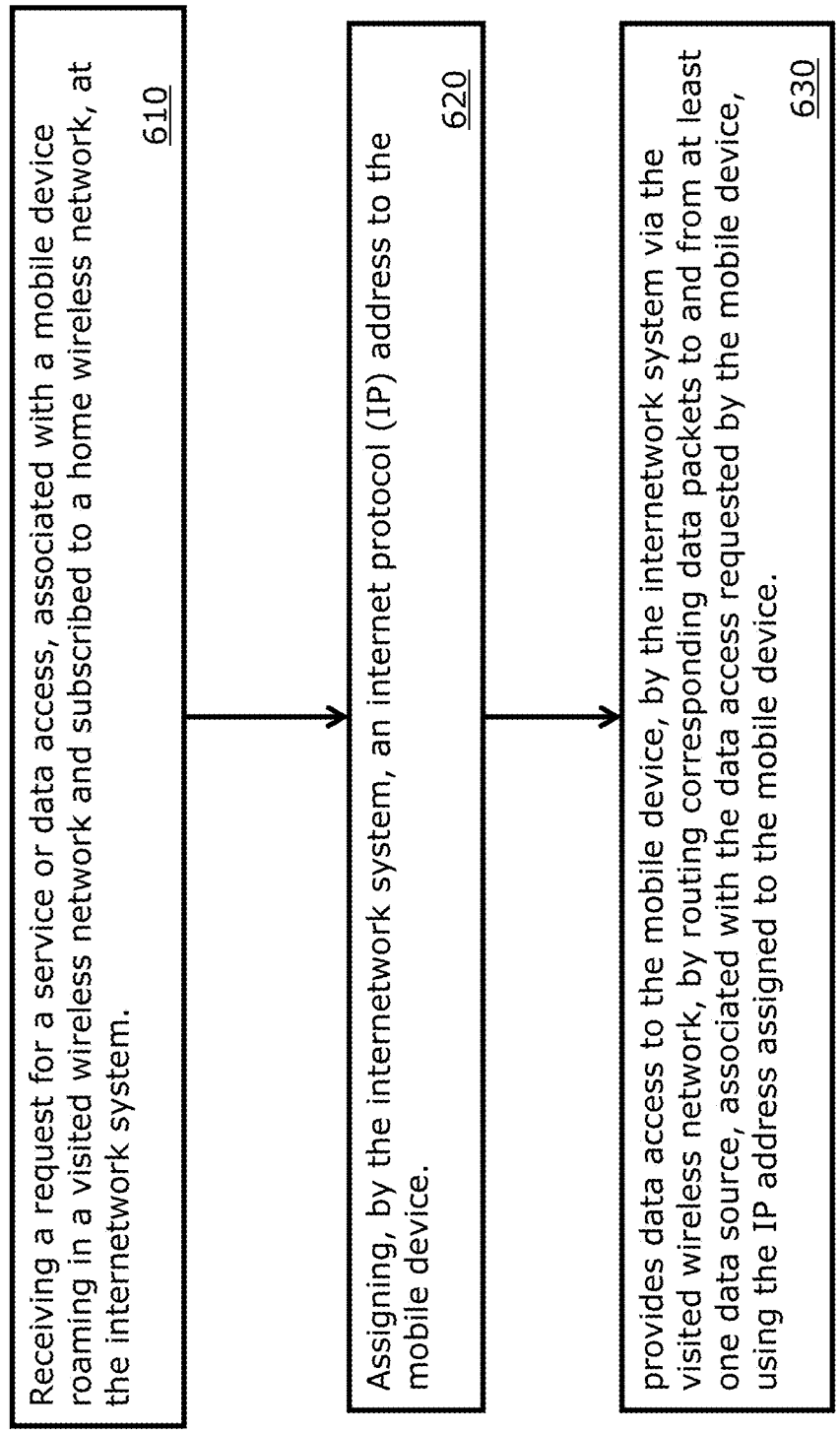
FIG. 6 is a flow chart illustrating a method of handling roaming services for mobile devices according to at least one example embodiment.

FIG. 6 is a flowchart illustrating a method of hub breakout roaming performed by a hub breakout system 130. At 610, a request for a service or data access is received at the hub breakout system 130, e.g., IPX breakout system 230. The request for data access is associated with a mobile device roaming 115 in a visited wireless network, e.g., 120 and 220.

The mobile device is subscribed to a home wireless network, e.g., 110 and 210. At 620, an IP address is assigned to the roaming mobile device 115 by the hub breakout system, e.g., 130 or 230. Specifically the IP address is assigned to the roaming mobile device by a P-GW, e.g., 235, of the hub breakout system, e.g., 130 or 230. At 630, the hub breakout system, e.g., 130 or 230, provides data access to the mobile device 115, via the visited wireless network, e.g., 120 and 220, by routing corresponding data packets to and from at least one data source, associated with the data access requested by the mobile device 115, using the IP address assigned to the mobile device.

A person skilled in the art should appreciate that embodiments described herein are not limited to LTE networks or IPX systems. In fact, hub breakout roaming may be employed with other wireless networks or other communications networks in general. For example, the approach of hub breakout roaming may be employed with communications networks providing Internet and data access. Also other hub networks, or hub breakout systems, other than IPX system or IPX breakout system, may be used to implement hub breakout roaming functions.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of handling roaming services for mobile devices, the method comprising:
    receiving, at a visited communications network, a request for data access from a user network device, the user network device being subscribed to a home communications network;
    routing, at the visited communications network, data packets, associated with the data access requested by the user network device, to and from at least one corresponding data source using an internet protocol (IP) address assigned by a hub breakout system to the user network device, wherein both the home communications network and the visited communications network are separate from the hub breakout system and wherein the hub breakout system is coupled to both the home communications network and the visited communications network, wherein the IP address is assigned by the hub breakout system to the user network device by a gateway module in the hub breakout system;
    receiving, at the visited communications network, an indication of the gateway module in the hub breakout system; and
    causing a connection to be established between the gateway module in the hub breakout system and a gateway module in the visited communications network, the established connection being used to exchange data packets associated with the requested data access between the visited communications network and the hub breakout system.

2. The method according to claim 1, wherein the connection is a general radio packet service (GPRS) tunneling protocol (GTP) tunnel between the hub breakout system and the visited communications network.

3. The method according to claim 1, wherein receiving the indication of the gateway module in the hub breakout system includes receiving a modified service profile associated with a user of the user network device from the hub breakout system.

4. The method according to claim 3, wherein the modified service profile associated with the user is received by a mobility management entity in the visited communications network, and connection is caused by the mobility management entity (MME) instructing the gateway module in the visited communications network to connect to the gateway module in the hub breakout system.

5. The method according to claim 1, wherein the at least one data source includes at least one of:
an internet network; and
a private network associated with the home communications network.

6. The method according to claim 1, wherein the routing includes routing the data packets through a private subnet designated by the hub breakout system to the home communications network, the private subnet including one or more IP addresses.

7. The method according to claim 1, wherein routing the data packets includes employing one or more routing policies for routing data packets based on the IP address assigned to the user network device.

8. The method according to claim 1, wherein the assigned IP address is a private IP address or a public IP address.

9. The method according to claim 1, wherein the home communications network and the visited communications network are wireless networks.

10. The method according to claim 1, wherein the IP address is assigned by the hub breakout system to the user network device by a gateway module in the hub breakout system and wherein the hub breakout system causes selection of the gateway module in the hub breakout system based on at least one of the following:
geographical location of the gateway module in relation to the visited communications network;
identity of the visited communications network or the home communications network;
a user group associated with the user network device;
type of the user network device;
an identifier of the user network device;
access point name associated with the user network device;
bandwidth associated with a connection between the visited communications network and the gateway module;
delay associated with a connection between the visited communications network and the gateway module; and
agreement between the hub breakout system and the visited communications network or the home communications network.

11. The method according to claim 1, wherein the request for data access includes a request to access at least one of the following:
a voice service;
a messaging service;
a video service; and
a data service.

12. A communications system comprising:
a first network element in a visited communications network configured to receive a request for data access from a user network device, the user network device being subscribed to a home communications network;
a gateway module in the visited communications network configured to route data packets, associated with the data access requested by the user network device, to and from at least one corresponding data source using an internet protocol (IP) address assigned by a hub breakout system to the user network device, wherein both the home communications network and the visited communications network are separate from the hub breakout system and wherein the hub breakout system is coupled to both the home communications network and the visited communications network, wherein the IP address assigned by the hub breakout system to the user network device is assigned by a gateway module in the hub breakout system; and
a second network element in the visited communications network, the second network element configured to:
receive an indication of the gateway module in the hub breakout system; and
cause a connection to be established between the gateway module in the visited communications network and the gateway module in the hub breakout system, the established connection being used to exchange the data packets associated with the requested data access between the visited communications network and the hub breakout system.

13. The communications system according to claim 12, wherein the connection is a general radio packet service (GPRS) tunneling protocol (GTP) tunnel between the hub breakout communications system and the visited communications network.

14. The communications system according to claim 12, wherein the received indication of the gateway module in the hub breakout system is a modified service profile associated with a user of the user network device received from the hub breakout system.

15. The communications system according to claim 12, wherein the second network element is further configured to instruct the gateway module in the visited communications network to connect to the gateway module in the hub breakout system.

16. The communications system according to claim 12, wherein the at least one data source includes at least one of:
an internet network; and
a private network associated with the home communications network.

17. The communications system according to claim 12, wherein the gateway module in the visited communications network is further configured to route the data packets through a private subnet designated by the hub breakout system to the home communications network, the private subnet including one or more IP addresses.

18. The communications system according to claim 12, wherein the gateway module in the visited communications network is further configured to route the data packets by employing one or more routing policies for routing data packets based on the IP address assigned to the user network device.

19. The communications system according to claim 12, wherein the assigned IP address is a private IP address or a public IP address.

20. The communications system according to claim 12, wherein the home communications network and the visited communications network are wireless networks.

21. The communications system according to claim 12, wherein the IP address assigned by the hub breakout system to the user network device is assigned by a gateway module in the hub breakout system and wherein the hub breakout system is configured to cause a selection of the gateway module in the hub breakout system based on at least one of the following:

geographical location of the gateway module in the hub breakout system in relation to the gateway module in the visited communications network;
identity of the visited communications network or the home communications network;
a user group associated with the user network device;
type of the user network device;
an identifier of the user network device;
access point name associated with the user network device;
bandwidth associated with a connection between the gateway module in the hub breakout system and the gateway module in the visited communications network;
delay associated with a connection between the gateway module in the hub breakout system and the gateway module in the visited communications network; and
agreement between the hub breakout system and the visited communications network or the home communications network.

22. The communications system according to claim 12, wherein the request for data access includes a request to access at least one of the following:
a voice service;
a messaging service;
a video service; and
a data service.

23. A method of handling roaming services for mobile devices, the method comprising:
receiving, at a home communications network, a request for a profile of a subscriber of the home communications network from a routing agent in a hub breakout system, the subscriber having a user network device coupled to a visited communications network, the profile indicating whether or not a local breakout is allowed;
sending, from a subscriber profile database at the home communications network, the requested profile to the routing agent in the hub breakout system to be modified, the modified profile indicating that the local breakout is not allowed, wherein both the home communications network and the visited communications network are separate from the hub breakout system; and
establishing a connection between a private subnet in the hub breakout system and the home communications network, the established connection enabling the user network device coupled to the visited communications network to access a private network associated with the home communications network.

24. The method according to claim 23, wherein the established connection is a virtual private network (VPN) connection.

25. The method according to claim 23, further comprising receiving a domain name system (DNS) query at the home communication network from the user network device, and routing an internet protocol (IP) payload based on the received DNS query.

26. The method according to claim 25, wherein receiving the DNS query includes receiving the DNS query by a DNS server in the home communications network.

27. The method according to claim 25, wherein routing the IP payload includes routing the IP payload to the private network associated with the home communications network.

28. The method according to claim 25, wherein routing the IP payload includes routing the IP payload to a public network.

29. A communications system comprising:
a subscriber database in a home communications network configured to:
receive a request for a profile of a subscriber of the home communications network from a routing agent in a hub breakout system, the subscriber having a user network device coupled to a visited communications network, the profile indicating whether or not a local breakout is allowed; and
send the requested profile to the routing agent in the hub breakout system to modify the profile, the modified profile indicating that the local breakout is not allowed, wherein both the home communications network and the visited communications network are separate from the hub breakout system; and
a private network associated with the home communications network, the private network having a connection to a private subnet in the hub breakout system, the connection enabling the user network device coupled to the visited communications network to access the private network associated with the home communications network.

30. The communications system of claim 29, wherein the connection is a virtual private network (VPN) connection.

31. The communications system of claim 29, further comprising a domain name system (DNS) server in the home communications network, the DNS server configured to receive a DNS query at the home communication network and cause an internet protocol (IP) payload to be routed based on the received DNS query.

32. The communications system of claim 31, wherein the IP payload is routed to the private network associated with the home communications network.

33. The communications system of claim 31, wherein the IP payload is routed to a public network.

34. A method of handling roaming services for mobile devices, the method comprising:
receiving, at a hub breakout system communicatively coupled to a first home communication network and a second home communication network, a first request for data access associated with a first user network device roaming a visited communications network, the first user network device being subscribed to the first home communications network and a second request for data access associated with a second user network device roaming the visited communications network, the second user network device being subscribed to the second home communications network;
assigning, by the hub breakout system, an internet protocol (IP) address to each of the first and second user network devices;
routing, by the hub breakout system, data packets associated with the data access requested by the first and second user network devices, to and from at least one corresponding data source using the assigned IP addresses, wherein the IP addresses are assigned by the hub breakout system to the user network device by at least one gateway module in the hub breakout system;
sending an indication of the at least one gateway module in the hub breakout system to the visited communications network; and
causing a connection to be established between the at least one gateway module in the hub breakout system and a gateway module in the visited communications network, the established connection being used to exchange data packets associated with the data access requested by the first and second user network devices between the visited communications network and the hub breakout system.

35. A method of handling roaming services for mobile devices, the method comprising:
receiving, at a hub breakout network, a request for data access associated with a user network device roaming in a visited communications network, the user network device being subscribed to a home communications network;
causing, by the hub breakout network, selection of a gateway module in the hub breakout network;
assigning, by the gateway module in the hub breakout network, an internet protocol (IP) address to the user network device;
routing, by the hub breakout network, data packets, associated with the data access requested by the user network device, to and from at least one corresponding data source using the assigned IP address, wherein the home communications network, the visited communications network, and the hub breakout network are separate networks, wherein the hub breakout system is coupled to both the home communications network and the visited communications network, and wherein the selection of the gateway module is based on at least one of the following: (i) geographical location of the gateway module in relation to the visited communications network, (ii) identity of the visited communications network or the home communications network, (iii) a user group associated with the user network device, (iv) type of the user network device, (v) an identifier of the user network device, (vi) access point name associated with the user network device, (vii) bandwidth associated with a connection between the visited communications network and the gateway module, (viii) delay associated with a connection between the visited communications network and the gateway module, and (ix) agreement between the hub breakout system and the visited communications network or the home communications network;
sending an indication of the gateway module in the hub breakout system to the visited communications network; and
causing a connection to be established between the gateway module in the hub breakout system and a gateway module in the visited communications network, the established connection being used to exchange data packets associated with the data access requested by the user network device and the hub breakout system.

36. A hub breakout communications system comprising:
a gateway subsystem configured to:
receive a request for data access associated with a user network device roaming in a visited communications network, the user network device being subscribed to a home communications network;
cause a selection of a gateway module in the gateway subsystem to assign an internet protocol (IP) address to the user network device; and
send an indication of the gateway module in the hub breakout system to the visited communications network; and
a router subsystem configured to route data packets, associated with the data access requested by the user network device, to and from at least one corresponding data source using the assigned IP address, wherein the home communications network, the visited communications network, and the hub breakout communication system are separate networks, wherein the hub breakout system is coupled to both the home communications network and the visited communications network, and wherein the selection of the gateway module is based on at least one of the following: (i) geographical location of the gateway module in relation to the visited communications network, (ii) identity of the visited communications network or the home communications network, (iii) a user group associated with the user network device, (iv) type of the user network device, (v) an identifier of the user network device, (vi) access point name associated with the user network device, (vii) bandwidth associated with a connection between the visited communications network and the gateway module, (viii) delay associated with a connection between the visited communications network and the gateway module, and (ix) agreement between the hub breakout system and the visited communications network or the home communications network; and
cause a connection to be established between the gateway module in the hub breakout system and a gateway module in the visited communications network, the established connection being used to exchange data packets associated with the data access requested by the user network device and the hub breakout system.

37. A method of handling roaming services for mobile devices, the method comprising:
receiving, at a home communications network, a request for a profile of a subscriber of the home communications network from a routing agent in a hub breakout system, the subscriber having a user network device coupled to a visited communications network, the profile indicating whether or not a local breakout is allowed;
sending, from a subscriber profile database at the home communications network, the requested profile to the routing agent in the hub breakout system to be modified, the modified profile indicating that the local breakout is not allowed, wherein both the home communications network and the visited communications network are separate from the hub breakout system; and
receiving charging data, at the home communications network, from a charging gateway in the hub breakout system, the charging data being generated by a gateway module in the hub breakout system in response to data requests from the user network device and the charging data being associated with the user network device coupled to the visited communications network.

38. A communications system comprising:
a subscriber database in a home communications network configured to:
receive a request for a profile of a subscriber of the home communications network from a routing agent in a hub breakout system, the subscriber having a user network device coupled to a visited communications network, the profile indicating whether or not a local breakout is allowed; and
send the requested profile to the routing agent in the hub breakout system to modify the profile, the modified profile indicating that the local breakout is not allowed, wherein both the home communications network and the visited communications network are separate from the hub breakout system; and a charging gateway module in the home communications network configured to:
receive charging data generated by a gateway module in the hub breakout system in response to data requests from the user network device, the charging data being associated with the user network device coupled to the visited communications network.

\* \* \* \* \*